United States Patent
Mitchell et al.

(10) Patent No.: US 8,416,123 B1
(45) Date of Patent: Apr. 9, 2013

(54) RADAR SYSTEM FOR CONTINUOUS TRACKING OF MULTIPLE OBJECTS

(75) Inventors: Richard L. Mitchell, Palos Verdes, CA (US); August W. Rihaczek, Rolling Hills, CA (US)

(73) Assignee: MARK Resources, Inc., Torrance, CA (US)

( * ) Notice: Subject to any disclaimer, the term of this patent is extended or adjusted under 35 U.S.C. 154(b) by 278 days.

(21) Appl. No.: 12/984,175

(22) Filed: Jan. 4, 2011

Related U.S. Application Data

(60) Provisional application No. 61/292,716, filed on Jan. 6, 2010.

(51) Int. Cl.
*G01S 13/58* (2006.01)

(52) U.S. Cl.
USPC .......... 342/107; 342/109; 342/113; 342/146; 342/147; 342/156

(58) Field of Classification Search ........... 342/104–158
See application file for complete search history.

(56) References Cited

U.S. PATENT DOCUMENTS

| | | |
|---|---|---|
| 2,422,107 A | 6/1947 | Luck |
| 2,852,772 A | 9/1958 | Gitzendanner |
| 3,218,639 A | 11/1965 | Mercer et al. |
| 3,242,487 A | 3/1966 | Hammack |
| 3,479,494 A | 11/1969 | Wilmotte |
| 4,184,154 A | 1/1980 | Albanese et al. |
| 4,471,357 A | 9/1984 | Wu et al. |
| 4,538,152 A | 8/1985 | Wirth |
| 4,670,755 A | 6/1987 | Gellekink et al. |
| 4,744,042 A | 5/1988 | Hyatt |
| 4,989,008 A | 1/1991 | Fujisaka et al. |
| 5,053,784 A | 10/1991 | Hippelainen |
| 5,132,688 A | 7/1992 | Shima et al. |
| 5,341,141 A | 8/1994 | Frazier et al. |
| 5,347,283 A | 9/1994 | Krizek et al. |
| 5,361,072 A | 11/1994 | Barrick et al. |

(Continued)

FOREIGN PATENT DOCUMENTS

DE 3740142 6/1989

OTHER PUBLICATIONS

Mitchell, R. L., "Prefolding and Zero Fill in FFT Processing", *IEEE Transactions on Aerospace and Electronic Systems*, vol. 25, No. 4, (Jul. 1989), pp. 580-581.

(Continued)

*Primary Examiner* — Timothy A Brainard

(74) *Attorney, Agent, or Firm* — Blakely Sokoloff Taylor & Zafman LLP

(57) ABSTRACT

A non-scanning radar for detecting and tracking multiple moving objects. The transmit antenna continuously illuminates the entire surveillance volume, which can even be omni-directional (hemispherical). Multiple receive antennas are employed, each covering part of the surveillance volume. Receivers are used in combination to measure angles of incidence via interferometry on objects that are resolved in range and Doppler. Very long processing times are used to compensate for the reduced antenna gain compared to any radar that scans. By continuously illuminating the surveillance volume, there is no hard limit to the number of objects that can be simultaneously tracked. The primary application for this technology is detection and tracking of such objects as bullets, artillery projectiles, mortar shells, and rockets, and determining the location of the weapon that fired them. Numerous other applications are also described.

23 Claims, 1 Drawing Sheet

U.S. PATENT DOCUMENTS

| | | |
|---|---|---|
| 5,559,518 A | 9/1996 | DiDomizio |
| 5,594,451 A | 1/1997 | Krikorian et al. |
| 5,907,568 A | 5/1999 | Reitan, Jr. |
| 6,188,348 B1 | 2/2001 | Raney |
| 6,239,747 B1 | 5/2001 | Kaminski |
| 6,292,129 B1 | 9/2001 | Matsugatani et al. |
| 6,963,314 B2 | 11/2005 | Webb et al. |
| 6,982,668 B1 | 1/2006 | Doerry et al. |
| 7,088,956 B2 | 8/2006 | Kishigami et al. |
| 7,626,536 B1 * | 12/2009 | Rihaczek et al. ............... 342/96 |
| 2003/0052813 A1 | 3/2003 | Natsume |
| 2006/0238403 A1 | 10/2006 | Golan et al. |
| 2008/0174474 A1 | 7/2008 | Harris et al. |

OTHER PUBLICATIONS

Perry, R. P., et al., "SAR Imaging of Moving Targets", *IEEE Transactions on Aerospace and Electronic Systems*, vol. 35, No. 1, (Jan. 1999), pp. 188-199.

Skolnik, Merril I., "Radar Handbook", *McGraw-Hill*, 2nd Ed., (1990), pp. 2.25-2.26.

* cited by examiner

RADAR SYSTEM FOR CONTINUOUS TRACKING OF MULTIPLE OBJECTS

CROSS-REFERENCE TO RELATED APPLICATIONS

This application claims the benefit of U.S. Provisional Patent Application No. 61/292,716 filed Jan. 6, 2010.

BACKGROUND OF THE INVENTION

1. Field of the Invention

The present invention relates to the field of radar as applied to the detection and tracking of objects fired by hostile weaponry and determining location of the weapon. It also relates to detection and tracking of moving objects in general.

2. Prior Art

The radar system of the present invention is of the general type described in U.S. Pat. No. 7,626,536, the disclosure of which is hereby incorporated herein by reference. The basis of this existing patent is use of a non-scanning antenna beam that continuously illuminates the surveillance sector of interest. This feature eliminates much of the cost associated with radars that employ scanning antenna beams, and it also provides numerous additional benefits, including the ability to search for new targets while simultaneously tracking existing ones. There is no longer any conflict in the allocation of time spent in these functions, as tracking of an increasing number of targets does not affect the time spent in search. No matter how many targets are being tracked, the radar will still be able to devote all of its resources to searching for new ones.

DETAILED DESCRIPTION OF THE PREFERRED EMBODIMENTS

As with the above referenced patent, the present invention makes effective use of conventional radar technology, including pulse compression for achieving resolution in range, coherent processing for achieving resolution in Doppler, the combination of both for two-dimensional imaging, noncoherent processing for smoothing of background noise fluctuations, clutter mapping for regulation of the detection threshold, interferometry for measuring angle, and conventional target tracking techniques in general.

A wide antenna beam has less gain than a narrow one that scans, and in order to maintain the same detection performance it is necessary to increase the energy for the detection process. Either the transmit power or the processing interval needs to be increased, or some combination of both. There are practical limits to the transmit power that can be used in any application, so the emphasis has to be on increasing the processing interval. This introduces a problem not usually found in conventional surveillance radars, namely migration of the target return through range and Doppler resolution cells, which reduces the effectiveness of the resolution process. To solve this problem the present invention uses techniques for compensating the target motion that are common in other branches of radar, such as synthetic aperture radar (SAR) and inverse SAR.

Figure 1:
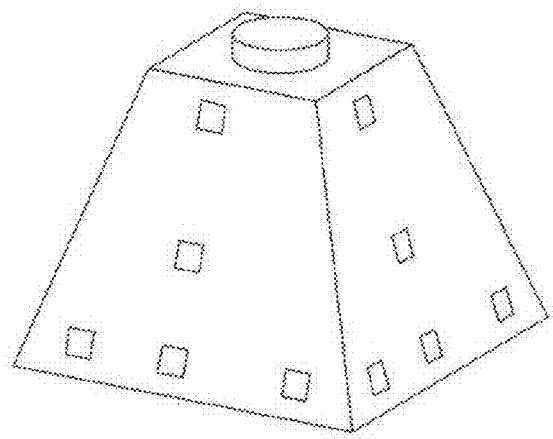
FIG. 1 is an illustration of a preferred embodiment on a four-sided pyramid.

The emphasis in the above referenced patent was use of a transmit antenna that illuminated the entire surveillance sector of interest, and a set of receive antennas that covered the same sector. Multiple receive antennas are needed to provide the ability to measure angle accurately via interferometry. This technique was aimed primarily at short-range operation, and was faced with the potential problem of mutual coupling between the transmit and receive antennas if all were to provide omni-directional (360°) coverage in the azimuth dimension. The present invention avoids this potential problem by restricting the coverage of the individual receive antennas. The preferred embodiment uses five directive receive antennas on the face of a plane, such that all five antennas cover the same azimuth sector of 90°. This arrangement is replicated to cover a wider sector in azimuth, so that, for example, four sets of five receive antennas can provide omni-directional coverage in azimuth. This preferred embodiment is illustrated in FIG. 1 on a four-sided truncated pyramid, although a four-sided prism could also be used. The transmit antenna shown on top of the pyramid illuminates the entire surveillance volume of interest. This use of a separate antenna for transmit, as in the above referenced patent, allows continuous waveforms to be used, and also eliminates the need for duplexers at each receive antenna when pulsed waveforms are used.

As shown in FIG. 1, the five antennas on each face of the pyramid are arranged so that three of them define a horizontal baseline and three a vertical baseline, with one antenna in common, in order to facilitate the interferometric measurements. Different spacings of antennas allow the angle ambiguities inherent with an interferometer to be resolved. Five antennas on each face of the pyramid are needed for reliable angle measurements in two dimensions, but only three in the horizontal dimension would be needed if the elevation angle were not of interest. The structure can be reduced to two or three faces, or increased to five or more, with the same general principles being applied. A structure with more faces can employ more directive receive antenna patterns, with higher gain, at the cost of more receivers and more processing complexity. Regardless of the number of faces, the processing at each face is independent of the others. Note that the faces can also be vertical without changing the basic nature of the concept. Note also that the transmit antenna can be designed to selectively illuminate fewer sectors if some are not being used, in order to conserve energy (fuel).

While five receive antennas on each face of the structure is the preferred embodiment of the present invention to provide coverage in both the azimuth and elevation dimensions, it is possible to utilize as few as four receive antennas per face, although with diminished performance, as well as more than five receive antennas per face to provide an improvement in performance.

Figure 2:
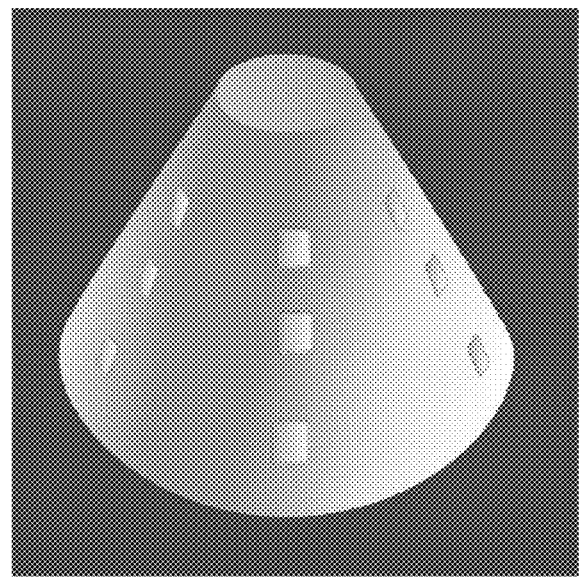
FIG. 2 is an illustration of an alternative embodiment on a truncated cone.

While the pyramid structure or prism is the preferred embodiment of the present invention, the antennas can also be arranged about a cylinder or truncated cone, as illustrated in FIG. 2, to provide omni-directional coverage in azimuth. The transmit antenna (not shown in FIG. 2) would be at the top of the structure to illuminate the entire surveillance sector of interest. In this alternative configuration, receive antennas need to be distributed in both dimensions on the surface of the structure in order to measure both the azimuth and elevation angles, while only one row of receive antennas would be needed if the elevation angle were not of interest. In either case, the elevation patterns of all antennas are matched to the elevation sector of interest. The azimuth patterns of adjacent receive antennas must overlap sufficiently to measure the azimuth angle, and if the antennas are equally spaced about the structure, then the measurement ambiguities of the interferometer can be resolved with use of the amplitude information at each antenna.

As discussed above, when the antenna beams are wide, in order to make up for the reduced gain of the antenna the processing interval will have to be much longer than what would normally be used in a surveillance radar. This long-term processing can result in migration of the target return through range and Doppler resolution cells, reducing the effectiveness of the resolution process. Solving this problem requires considerable computer resources, but the processing for acquisition is identical in all receive channels, regardless of the configuration, which simplifies the software development. Modern computer technology makes it all feasible.

Implementation of the Concept

The present invention employs signal processing techniques that are commonly used in the radar community, although not in combination as in the present invention. Range gating is the formation of range resolution cells, typically through the use of pulse compression, where the range resolution cell is smaller than the range extent of the pulse. Range resolution is nominally defined as c/2B, where c is the speed of light and B is the bandwidth used in the compression process. The product TB, where T is the length of the pulse, can be quite large. The transmission can also be continuous, typically with the linear-FM waveform, which is repeated without gaps. In this case the process of range gating is different than with pulses, but the end result is the same. It is expedient to use the term "pulse" for the repeated part of the continuous waveform, even though it is not a true pulse.

After pulse compression, or the equivalent process with the continuous waveform, the next step is coherent processing of a sequence of pulses to achieve resolution in Doppler. The length of this interval is usually called the coherent processing interval (CPI). Coherent processing is essentially the formation of a bank of Doppler filters, and is usually implemented with a so-called fast Fourier transform (FFT). If the range-gated samples for each pulse form the columns of a matrix, Doppler or FFT processing would be implemented on the rows. The nominal resolution in Doppler is the reciprocal of the CPI. The present invention, as well as the above-mentioned patent, relies on use of a long CPI to overcome the reduced gain of the wide-beam antennas. The result is that the width of a Doppler resolution cell is narrow, so narrow in fact that returns from some targets could migrate across several Doppler resolution cells. There is a similar, but usually less severe problem with migration in the range dimension. The term "long-term processing" is used herein to designate CPIs that are much longer than those in common use, where range and Doppler migration effects are of little concern. For example, the processing interval used in any radar that scans is not likely to exceed a few milliseconds, whereas the processing interval in the present invention will typically be 10 to 100 times greater.

Up to this point, the processing is coherent, which means that all samples are represented by complex numbers. For a mathematician, the components of a complex number are real and imaginary, but in the radar community they are often referred to as the in-phase and quadrature components. After pulse compression and Doppler filtering, the samples are envelope detected, which is the conventional term used to designate the mathematical operation of taking the magnitude, or the square of the magnitude, of the complex numbers. In this process the phase associated with each complex number is lost.

Note that a separate receiver is needed at each antenna. In order to improve the detection performance, the envelope-detected outputs of receivers covering the same surveillance volume are noncoherently combined (summed). Since the noise is independent in each receiver channel, summing of the receiver outputs smoothes the noise fluctuations, which allows a lower detection threshold to be used for increased system sensitivity.

The range-gated, Doppler-filtered, envelope-detected, and noncoherently combined samples are used to form an image, which is commonly done in synthetic aperture radar (SAR) where images of terrain are made from an airborne platform, and in inverse SAR where images are made of moving targets from a stationary radar. The same process is used in the present invention to detect and track targets, even multiple targets at the same time. Doppler resolution is essential in this process, as it enables the radar to distinguish targets from each other and from clutter. As long as the target Doppler lies outside of the clutter spectrum, it is potentially detectable even though its return may be several orders of magnitude weaker than the clutter. If the target Doppler lies within the clutter spectrum, the radar will have considerable difficulty detecting the presence of the target, unless its return is particularly strong and the clutter is weak. The extent of the clutter spectrum is commonly designated as the blind-speed interval. One advantage of a long CPI is that the blind-speed interval is narrow, and failure to detect the target will be short lived. One usually refers to detection of weak targets in the presence of clutter as suppression of the latter. The degree of clutter suppression that can be achieved depends on the level of the sidelobes in the Doppler filtering process, which is dictated by the weighting function used prior to the FFT.

Use of the long CPI leads to an image that contains a large number of resolution cells, which could be in excess of 100,000 in a preferred embodiment of the present invention. Normally a high detection threshold would be required in order to keep the false alarm rate at a reasonably low level. However, by examining the locations of threshold crossings in a sequence of images for consistency, it is possible to dismiss those induced by noise. This will allow a relatively low detection threshold to be used in the combined process of detection and acquisition, which will provide greater system sensitivity. Moreover, any track initiated on the basis of noise will be quickly dropped. There is never an energy penalty for false tracks in the non-scanning radar.

As mentioned above, the long CPI may result in migration of target returns in range and Doppler, which would diminish the effectiveness of the resolution process. In order to mitigate this problem, the outputs of adjacent range gates and Doppler filters are noncoherently combined, pair-wise in sliding-window fashion. This is known as collapsing of the gates and filters, which allows the gates and filters to be fairly widely spaced without incurring much loss when the return straddles the gates and filters. Although there is a collapsing loss associated with this process, much of this loss is recovered in the noncoherent smoothing process.

Imaging provides direct information on the range and Doppler of each target. By repeating the process on consecutive CPIs, it is possible to form tracks of target returns in range and Doppler. One also needs information on the angle or angles that define the radial vector to the target. This is accomplished by interferometry, where the angle of incidence relative to the baseline formed by two antennas is related to the phase difference between the two antennas. Measurement of the angle of incidence with an interferometer thus requires use of the signal phase, which means that the complex signal prior to envelope detection must be retained for this measurement.

This essential feature of the present invention, as well as the above referenced patent, has only been practical with modern computer technology. Note that only after targets are resolved (isolated) in either range or Doppler, or both, can the measurements of angle be performed.

The problem with an interferometer is that the phase difference can be measured only within an interval of $2\pi$ radians, which means that the measurement of the angle of incidence is ambiguous. In other words, several angles can result in the same phase difference. The multiple angles are sometimes called the grating lobes of an interferometer. If all receive antenna beams cover the same volume, the only way to determine which angle is correct is to make use of another pairing of antennas with a different spacing. This is why there are five antennas in the configuration of FIG. 1. If the antenna beams do not completely overlap, as in the configuration of FIG. 2, then it is possible to make additional use of the amplitude information at each antenna to determine the correct angle. In either case, a wider spacing of antennas leads to better measurement precision, but also causes greater difficulties in the ambiguity resolution process. The number, spacing, and arrangement of antennas are thus critical parts of the radar design.

Noncoherent combining of images and the noncoherent collapsing of gates and filters contribute to the high sensitivity needed for target detection, acquisition, and tracking in range and Doppler. On the other hand, in order to measure angle one needs to use the complex signal prior to envelope detection, where one can no longer enjoy the benefits of noncoherent processing. In order to make up for the reduced sensitivity, the CPI is increased even more, which would ordinarily result in additional losses associated with migration of the target return in range and Doppler. However, in this case one can make use of the existing track in these dimensions to compensate for the target motion during the CPI. In effect, the return can be focused into one or a few resolution cells, taking full advantage of the benefit of the coherent processing. The processing is identical in all receive channels, and the angle measurements are made on the basis of the complex signal in the focused resolution cells. As noted above, motion compensation is a common technique used in other branches of radar, such as synthetic aperture radar and inverse synthetic aperture radar.

Multipath interference is a potential problem for all types of radar. It causes intermittent signal fading (reduction in the signal-to-noise ratio) and errors in the measurement of the angle of arrival, primarily in elevation. It is more of a problem for low trajectories, especially when the radar is close to the ground. For a scanning-beam radar, multipath interference can result in a loss of track, forcing the radar to spend extra energy reacquiring the target. No information on the target would be available during the interval of the fade. On the other hand, with the non-scanning radar, the raw data can be reprocessed with a longer CPI to increase the system sensitivity, which may allow recovery of the information on the target during the fade interval. Moreover, for the higher trajectories it may be possible with long-term processing to Doppler-resolve the returns on the direct and reflected paths, effectively eliminating the interference.

A critical step in the operation of any radar is setting the threshold for detection purposes. Regardless of how this is done, the objective has always been the same, namely to keep the false alarm rate to an acceptable level. Constant-false-alarm-rate (CFAR) processing is commonly used, where the threshold is based on the average power in resolution cells that surround the cell under test. High sensitivity can be achieved when there is little interference from clutter, as well as a low-false alarm rate in regions of strong clutter. A clutter map has also been used for so-called MTI radars, where there is a single Doppler filter for rejecting clutter. In this case, the domain of the clutter map is two-dimensional, range versus scan angle. Such radars are less common today, as the single MTI filter has been replaced by a bank of Doppler filters. Use of a clutter map in this case would also have to include the Doppler dimension. It would be very complicated to implement such a map and require a vast amount of computer memory.

The situation is different, however, for a non-scanning radar, since there is no scan angle to be recorded (and no way to measure the clutter distribution in angle). Use of a clutter map is once again attractive, as it is reduced to two dimensions, range and Doppler, although the latter dimension can be concentrated about zero Doppler (for a stationary radar). Several seconds of data can be collected and processed in the same manner as if live targets were present, and the data can be averaged to provide the threshold reference for detection purposes (a modest amount of spatial smoothing is also desirable). This procedure is far simpler to implement than conventional cell-averaging CFAR, and it does not suffer any so-called CFAR processing losses.

The practicality of the concept will now be demonstrated with two examples.

Application to Long-Range Tracking of Hostile Fire

Consider the requirement to detect and track multiple rockets, artillery, and mortar shells over 360° in azimuth, from 0° to 60° in elevation, and at least as far as 15 km in range. The first design decision is the choice of frequency band. For a fixed surveillance volume, it is more power efficient to operate in a low frequency band, assuming the radar cross section of the targets is not a factor, and L-band would be the preferred choice unless the antenna structure is impractically large. This choice of frequency band is also ideal for the long-range objects of interest.

Referring to the preferred configuration in FIG. 1, the next decision is the arrangement of the antennas on each face of the pyramid. For a 3-element interferometer covering a 90° sector, the elements should be spaced by $\lambda/2$ times a pair of consecutive integers, where $\lambda$ is the wavelength, in order to facilitate the ambiguity resolution process. The wavelength at L-band is about 24 cm. The minimum spacing is double that, so the pairing of 48 and 60 cm is the shortest possible baseline. A more capable choice for the horizontal baseline would be the pairing of 60 and 72 cm, which could fit within a pyramid that is about 1.6 meters wide at the base. Since the measurement of elevation angle is very critical for locating the weapon, the pairing of 72 and 84 cm is suggested for that dimension, which could fit within a pyramid that is about 1.8 meters tall.

Figure 3:
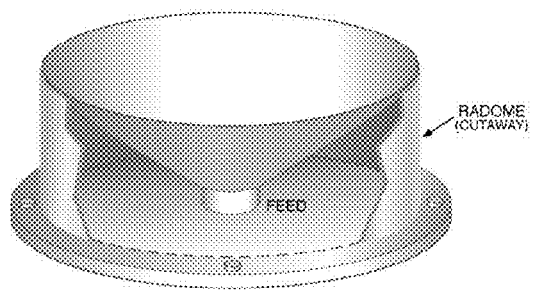
FIG. 3 is an illustration of a transmit antenna (bi-conical horn).

The transmit antenna (shown at the top of the pyramid in FIG. 1) needs to illuminate the entire surveillance sector, which is 360° in azimuth and 60° in elevation according to the above defined scenario. An efficient design for this antenna is the bi-conical horn, as illustrated in FIG. 3, which will have an effective gain of about 1 dB. Each receive antenna needs to cover the same elevation sector, but only 90° in azimuth for the configuration based on a four-sided pyramid. The preferred design is a flat panel antenna, which will have an effective gain of about 7 dB. Note that there will be a pattern loss of about 3 dB for targets that are at the edges of the 90° sector, but these targets will also be seen by two faces of the pyramid, so that much of this loss can be recovered.

Next, the transmit power needs to be determined. For this exercise, assume the radar has to detect a target cross section of 0.01 m² at the range of 10 km. Also assume the following:

a CPI of 100 ms, combined transmit and receive antenna gain of 7 dB, and the combination of receiver noise figure and system losses of 5 dB. Using the textbook radar range equation, an average transmit power of 2000 watts will provide a signal-to-noise ratio of about 5 dB in each receiver. Normally, this would be considered poor detection performance, but the outputs of the five receiver channels on each face of the pyramid are noncoherently combined to obtain an improvement in sensitivity of about 5 dB. The result is quite respectable considering that the radar can operate with a fairly high false alarm rate as discussed above. Note that this calculation applies for targets near the center of the combined transmit/receive antenna pattern.

The signal processing that takes place in the digital domain scales as the waveform bandwidth, which motivates one to have a relatively low bandwidth because of the large number of receive channels. However, the antenna beams are very wide, so it is important to have a relatively high resolution in range in order to reduce the dynamic range of the signal (and resolve closely spaced targets). A range resolution cell of about 20 meters is a reasonable compromise, which corresponds to a pulse bandwidth of about 10 MHz. With a 20-meter range cell, it is possible to measure range with a precision of about one meter when the signal-to-noise ratio is 20 dB or more.

When the resolution in range is high, one has to deal with the potential problem of the target return migrating in range. At the range rate of 600 m/s, for example, the return will migrate 60 meters in range during the CPI of 100 ms, which is three range resolution cells for this example. However, by noncoherently collapsing the range gates, pair-wise in sliding-window fashion, such a drift can be accommodated without any significant loss.

One also needs to account for range acceleration/deceleration effects. The Doppler resolution for the CPI of 100 ms is about 13 Hz, based on the typical weighting functions used to obtain low Doppler sidelobes. This corresponds to a range rate of about 1.5 m/s at L-band, which will accommodate a target acceleration of 15 m/s$^2$ in the CPI of 100 ms. However, by noncoherently collapsing the Doppler filters, pair-wise in sliding-window fashion, a drift of four times that amount can be accommodated without any significant loss. This is about the maximum range acceleration/deceleration that would be expected of ballistic targets, but the return from rockets during their powered phase will undergo much higher accelerations, and will consequently not be detectable until after burnout. The track can be established at that time.

As discussed above, reprocessing of raw data is required for the angle measurements, which involves compensating the target motion by the measured range track so that the return is focused in one or a few resolution cells. One can also use the same procedure to detect the target when it was not detectable in the first place, for example, during periods of multipath fading or high acceleration. The existing track can be extended or extrapolated into these periods, and the signal can be motion compensated, to increase the overall system sensitivity. For the accelerating rocket target, the track can be extrapolated backwards from the initial time of detection and perturbed to search for the best match. This will allow the target to be acquired and tracked before it was initially detected. This makes it a true "track-before-detect" capability.

After the target has been tracked in range, Doppler, and angle, it is possible to extrapolate the track to the ground to determine the location of the weapon. This is a standard procedure employed in modern weapon location systems that is relatively independent of the particular radar design.

Application to Short-Range Tracking of Hostile Fire

Suppose the radar has to detect small-arms fire, as well as larger objects, but at reduced range. The major difference here is that a higher frequency band would be a better match for the small bullets. One can design the radar at C-band in this example, although X-band would be a reasonable alternative if small size were important. The arrangement of antennas and the size of the pyramid scale as the wavelength, which means the C-band radar would be about 25% of the size of above L-band system. The largest dimension of the pyramid will be less than half of a meter.

Now examine how well this radar with an average power of 200 watts can detect a 50-caliber bullet at 1000 meters, about its maximum effective range. Assuming a CPI of 50 ms, the same system noise figure and losses as in the above example, and a target cross section of −37 dBm$^2$, the signal-to-noise ratio in each receiver will be 5 dB. As discussed above, this will be adequate to detect and acquire the 50-caliber bullet at 1000 meters, or the 30-caliber bullet at 500 meters.

A 20-meter range resolution cell, after pair-wise collapsing of range gates, will be more than adequate to contain the range drift of a target moving at 1000 m/s in the CPI of 50 ms. The Doppler resolution of this CPI is about 25 Hz, which corresponds to a range rate of about 0.7 m/s at C-band. After pair-wise collapsing of Doppler filters, the broadened cell will be wide enough to contain the return from a target with a range deceleration of at least about 60 m/s$^2$. However, the initial deceleration of a 50-caliber bullet is of the order of 400 m/s$^2$, so one needs to reduce the CPI to about 20 ms in order detect and acquire this object soon after it leaves the gun muzzle, which would reduce the system sensitivity by a factor of 2.5 (4 dB). Although it still may be adequate for detection, one can also noncoherently combine the outputs of consecutive CPIs in pair-wise fashion to regain some of the lost sensitivity.

In order to detect larger objects at longer range, one can employ a longer CPI. For example, with the CPI of 100 ms, the same radar will be able to detect a target with a cross section of −23 dBm$^2$ (that of a 3" sphere, for example) at the range of 2500 meters. The CPI can even be increased to 400 ms to increase the detection range of the same target to 3500 meters. Note that it is possible to detect and track both large and small targets simultaneously, because the CPI can be adjusted as a function of the range. It can be long at long range, where high sensitivity is needed, and short at short range where fast response, as well as the ability to accommodate high target accelerations, is needed. This adjustment of the CPI as a function of range is not possible with any radar that scans.

Summary and Comparison with Other Radars

Threats can be too numerous and too concentrated in time to be able to utilize any type of mechanically scanning antenna. An electronically scanning radar, namely one utilizing a phased array antenna, would be a potential solution since it would not be constrained by mechanical inertia, allowing the search and track functions to be interleaved and the scheduling of beams to adapt to the threat. Nevertheless, there are several distinct disadvantages of such a radar, including the following:

- Increasing the number of targets in track limits the track update rate and the time for search
- The tracker eventually gets saturated for a large number of targets
- Detection establishes the track file, and the trajectory must be extrapolated back to firing point
- The long dwell needed at long range is wasteful of energy for short-range targets A target entering into a blind-speed interval may result in a lost track Target discrimination is essential for effective use of available energy Tracking of many targets can result in track confusion Short dwells have poor clutter suppression performance Multipath interference can result in loss of track Significant plumbing losses are associated with phased array antennas Complexity of the hardware leads to significant problems associated with reliability and availability One potential solution to overcoming these disadvantages is to employ multiple simultaneous electronic-scanning antenna beams on receive. However, this would be a very costly solution in terms of hardware. The present invention is a radically different concept, since there is no scanning of antenna beams, and as a result it utilizes very inexpensive hardware. It is based on the following principles:

A wide antenna beam continuously illuminates the surveillance sector

Consequently the antennas are small and the system will be lightweight and compact The reduced antenna gain is made up with long processing times Even with wide beams, the target direction is accurately measured via interferometry Regardless of the number of targets in track, the full energy is available for both search and track This leads to several important advantages over the conventional technology:

Tracking is continuous, which is much more accurate than interrupted tracking, and not subject to track confusion The raw data can be reprocessed with longer CPIs for increased accuracy The raw data prior to the time of first target detection can be reprocessed to establish track continuity, which is a true "track-before-detect" capability There is no hard limit on the number of targets that can be tracked simultaneously The CPI can be adjusted as a function of range, providing high sensitivity at long range and fast response at short range Long CPIs have superior performance in clutter and a very narrow blind-speed interval Blind speed outages will be very short, allowing the tracker to coast through them Intervals of multipath interference can be reprocessed for increased system sensitivity False alarms and false tracks do not waste energy As a result, a relatively low detection threshold can be used for increased system sensitivity It is practical to implement a clutter map Target discrimination can be delayed in order to obtain a reliable estimate of its trajectory The small antennas are very efficient Simplicity of the hardware leads to high system reliability and availability There is a price to be paid for this high performance, however. For conventional scanning-beam radars the processing is relatively simple because the target return does not migrate significantly in range or Doppler within the short CPI, but the present invention has to deal with the effects of target motion within very long CPIs. As a result, the signal processing is very sophisticated. In effect, the system sophistication is transferred from hardware to software, but this is entirely practical with modern computer technology.

The preferred embodiments of the present invention are where the radar is stationary, either at a fixed site or on a movable platform. However, the same general principles also apply when the platform is in motion, either on the ground, at sea, or in the air. The primary differences when the platform is in motion are the spreading of clutter, which increases the width of the blind speed interval, and knowledge of the platform orientation, which requires some type of auxiliary sensor. Note that in some cases it should even be possible to detect target returns that appear within the spread clutter spectrum.

The radar technology described by this invention can be used to detect and track airborne objects, either singly or in multiple combinations, such as artillery projectiles, mortar shells, missiles, rockets, rocket-propelled grenades, bombs, bomblets, bullets, aircraft, helicopters, and unmanned airborne vehicles, and/or to derive the locations of the weapons that fired or launched the airborne objects. It can also be used to detect and track ground vehicles, automobiles, military vehicles, or personnel moving on the ground, boats, and any other object moving on the ground or sea surface, including large and small boats, semi-submersible water craft, or unmanned boats on the sea surface. Further, the invention may also be used to detect, track and score one or more bombs or bomblets dropped at a target.

It has been shown that the present invention has a number of aspects, which aspects may be practiced alone or in various combinations or sub-combinations, as desired. While certain preferred embodiments of the present invention have been disclosed and described herein for purposes of illustration and not for purposes of limitation, it will be understood by those skilled in the art that various changes in form and detail may be made therein without departing from the spirit and scope of the invention as defined by the full breadth of the following claims.

What is claimed is:

1. A method of operating a radar system comprising:
    transmitting on a non-scanning antenna beam that illuminates the entire search space;
    subdividing the search space into a specified number of sectors, each of which is covered by a set of non-scanning receive antenna beams;
    receiving returns from all targets within each designated sector covered by its set of antenna beams;
    processing the returns in each receiver to realize range resolution of the transmit waveform;
    processing returns in each receiver coherently to realize Doppler resolution within a specified processing interval;
    computing the magnitude or power in each range/Doppler resolution cell in each receiver;
    combining noncoherently those receiver outputs that cover or overlap in each sector;
    detecting the presence of a target or targets in the noncoherently combined receiver outputs;
    tracking each target in range and Doppler in consecutive processing intervals;
    motion compensating the original coherent radar data associated with each target using the range-Doppler track of that target;
    processing the motion-compensated coherent data associated with each target to measure both the azimuth and elevation angles of that target;
    repeating the processing on all targets in all sectors;
    where target detection, target acquisition, target tracking, and target analysis are being performed on the same data in each sector.

2. The method of claim 1 wherein the receive antennas are arranged about the faces of a truncated pyramid or prism.

3. The method of claim 1 wherein the receive antennas are arranged about a truncated cone or cylinder.

4. The method of claim 1 wherein the non-scanning transmit antenna selectively illuminates individual sectors.

5. The method of claim 1 wherein the processing of the motion-compensated coherent data associated with each target measures either the azimuth or elevation angle of that target.

6. The method of claim 1 wherein the processing of the motion-compensated coherent data associated with each target measures the angles by interferometry using the signal phase at each receiver.

7. The method of claim 1 wherein the processing of the motion-compensated coherent data associated with each target measures the angles by the combination of amplitude and phase information at each receiver.

8. The method of claim 1 wherein the processing includes pulse compression to achieve high resolution in range and to measure target range.

9. The method of claim 1 wherein the processing includes Doppler filtering to measure the target Doppler and suppress clutter.

10. The method of claim 1 wherein the existing track is extrapolated backwards in time to motion compensate the saved data and thereby detect the target at an earlier time.

11. The method of claim 1 wherein range resolution cells are noncoherently collapsed in sliding-window fashion to mitigate the effects of the returns from targets migrating in the range dimension.

12. The method of claim 1 wherein Doppler resolution cells are noncoherently collapsed in sliding-window fashion to mitigate the effects of the return from targets migrating in the Doppler dimension.

13. The method of claim 1 wherein the coherent processing interval is varied as a function of range using a longer processing time for longer range and a shorter processing time for shorter range.

14. The method of claim 1 used to detect and track one or more airborne objects.

15. The method of claim 14 wherein the airborne objects consist of artillery projectiles, mortar shells, missiles, rockets, rocket-propelled grenades, bombs, bomblets, bullets, aircraft, helicopters, and/or unmanned airborne vehicles.

16. The method of claim 14 used to derive the location of the weapon that fired or launched the airborne object.

17. The method of claim 1 used to detect one or more moving objects on the sea surface.

18. The method of claim 17 used to detect large and small boats, semi-submersible watercraft, or unmanned boats on the sea surface.

19. The method of claim 1 used to detect one or more moving objects on the ground.

20. The method of claim 19 used to detect automobiles, military vehicles, or personnel moving on the ground.

21. The method of claim 1 used to detect, track and score one or more bombs or bomblets dropped at a target.

22. The method of claim 1 where the radar is operated at a fixed site.

23. The method of claim 1 where the radar is operated from a moving platform, either on the ground, on the sea surface, or in the air.

* * * * *